United States Patent
Subrahamanyan et al.

(10) Patent No.: US 7,154,699 B2
(45) Date of Patent: Dec. 26, 2006

(54) HIGH BANDWIDTH LARGE STROKE SPIN-STAND

(75) Inventors: Pradeep K. Subrahamanyan, Hillsboro, OR (US); Patrick J. Korkowski, Savage, MN (US); Waleed A. Farahat, St. Louis Park, MN (US); Steven C Ehret, Inver Grove Heights, MN (US); Gregg J. Severson, Prior Lake, MN (US); Thomas S Rasmussen, Kasson, MN (US); Albert Van der Schans, Minnetonka, MN (US); Alexei H. Sacks, Edina, MN (US); James H. McGlennen, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 284 days.

(21) Appl. No.: 10/039,063

(22) Filed: Dec. 31, 2001

(65) Prior Publication Data

US 2003/0002198 A1    Jan. 2, 2003

Related U.S. Application Data

(60) Provisional application No. 60/302,596, filed on Jul. 2, 2001.

(51) Int. Cl.
    *G11B 5/596* (2006.01)
(52) U.S. Cl. .................................. 360/77.02
(58) Field of Classification Search .......... 360/77.02, 360/66, 75, 77.01, 78.11, 97.01, 25, 31, 78.09, 360/78.14, 78.04, 77.07, 77.05
    See application file for complete search history.

(56) References Cited

U.S. PATENT DOCUMENTS

| | | | | |
|---|---|---|---|---|
| 5,673,110 A | * | 9/1997 | Erickson et al. | 356/507 |
| 5,706,080 A | | 1/1998 | Pekin et al. | 356/72 |
| 6,031,685 A | * | 2/2000 | French et al. | 360/97.01 |
| 6,094,047 A | * | 7/2000 | Guzik et al. | 324/262 |
| 6,140,815 A | * | 10/2000 | Greene et al. | 324/262 |
| 6,195,215 B1 | | 2/2001 | Yanagimoto et al. | 360/25 |
| 6,265,868 B1 | | 7/2001 | Richter | 324/212 |
| 6,267,004 B1 | | 7/2001 | Ku et al. | 73/104 |
| 6,292,316 B1 | | 9/2001 | Dietzel et al. | 360/31 |
| 6,296,552 B1 | * | 10/2001 | Boutaghou et al. | 451/41 |
| 6,304,081 B1 | | 10/2001 | Richter | 324/210 |
| 6,396,179 B1 | * | 5/2002 | Sorenson et al. | 310/71 |
| 6,483,300 B1 | * | 11/2002 | Severson et al. | 324/212 |

(Continued)

*Primary Examiner*—Fred F. Tzeng
(74) *Attorney, Agent, or Firm*—Fellers, Snider, et al.

(57) ABSTRACT

A high bandwidth, large stroke spin-stand for testing components of a disc drive includes a coarse positioning stage and a rotary micropositioning stage. The spin-stand is capable of positioning a transducer head relative to the data storage disc based on one or both of: (1) an angular position of a rotary actuator arm in the rotary micropositioning stage; and (2) servo data read from the data storage disc. The angular position of the rotary actuator arm is detected by an encoder. In one embodiment, position adjustments are based on the detected angular position. In another embodiment, position adjustments are based on servo data read from the data storage disc, but are also conditional on angular position being consistent with the servo data. In yet another embodiment, both angular position and servo data from a track are linearized to generate PES adjustment parameters that are recorded on the data storage disc to redefine the track as more circular or to linearize the PES.

19 Claims, 7 Drawing Sheets

U.S. PATENT DOCUMENTS

| | | | |
|---|---|---|---|
| 6,510,752 B1 * | 1/2003 | Sacks et al. | 73/865.9 |
| 6,531,867 B1 * | 3/2003 | Greene et al. | 324/262 |
| 6,538,838 B1 * | 3/2003 | Sacks et al. | 360/77.01 |
| 6,566,870 B1 * | 5/2003 | Sorenson et al. | 324/210 |
| 6,608,477 B1 * | 8/2003 | Sacks et al. | 324/210 |
| 6,631,046 B1 * | 10/2003 | Szita et al. | 360/75 |
| 6,683,744 B1 * | 1/2004 | Takano et al. | 360/78.11 |
| 6,751,039 B1 * | 6/2004 | Cheng et al. | 360/66 |
| 2002/0054458 A1 * | 5/2002 | Subrahmanyan | 360/264.7 |

* cited by examiner

HIGH BANDWIDTH LARGE STROKE SPIN-STAND

RELATED APPLICATIONS

This application claims priority of U.S. provisional application Ser. No. 60/302,596, filed Jul. 2, 2001 and entitled "High Bandwidth Large Stroke Spin-stand for Component Testing".

FIELD OF THE INVENTION

This application relates generally to disc drive testing and more particularly to a spin-stand for testing disc drive components.

BACKGROUND OF THE INVENTION

Disc drive storage capacities are continuing to increase dramatically, resulting in part from rapid advances in on-disc coding schemes and magnetic sensitivities of read/write head components. Data (including servo data) is magnetically stored on concentric tracks patterned on the disc. The increase in track density on the disc relates to a corresponding decrease in the width of the read and write heads (e.g., transducer heads). As areal densities increase, previously negligible position error effects become more prominent. Therefore, positioning a transducer head precisely within a track becomes increasingly important and difficult. Accordingly, improved precision is required in the testing of data storage disc drive components to verify acceptable operation at these higher densities.

To adequately test the components of a data storage disc drive (e.g., read heads, head gimbal assemblies (HGAs), servo control schemes), therefore, test equipment must be improved to provide the precision needed to test these improved data storage disc drives. In fact, it is axiomatic that the precision of test equipment must exceed that of the improved data storage disc drives that it tests. The electrical characteristics of a read head, for example, are often evaluated on a high precision electrical tester called a "spin-stand". A spin-stand is designed for enhanced stability and typically includes a spindle on which a data storage disc is rotated at high speeds (e.g., 3,600 to 15,000 RPM, although spin-stands are known to achieve higher revolution speeds, such as 30,000 RPM in some current models) and a motion platform that positions a read/write head relative to the data storage disc rotating on the spindle. The motion platform usually includes a coarse positioning stage and a micropositioning stage. Both the spindle motor and the motion platform are securely mounted on a support base or stable surface. Coarse positioning is commonly implemented using X and Y oriented linear motors mounted to a stable surface. The micropositioning stage commonly includes a piezoelectric actuator and moves along a single axis under control of a higher precision linear motor. An incremental encoder or capacitive sensor responds to the linear position of the micropositioning stage to indicate the position of a transducer head mounted on the micropositioning stage.

However, even the existing two stage motion platforms cannot provide the needed precision and movement for higher density disc drives. First, it is desirable that the micropositioning stage also has a high servo bandwidth to better reject external disturbances (i.e., background vibrations, spindle excitation, and windage) and to hold the head on a track having high frequency irregularities. For example, to maintain proper track following of a higher density data storage disc, a micropositioning stage may have to change the radial position of the head multiple times during a single disc rotation. A positioning staging having this capability is referred to herein as having "high bandwidth." However, piezoelectric actuators used in existing spin stands cannot compensate for such high frequency variations observed in higher density data storage disc drives.

Second, it is also desirable for the read head to follow prewritten servo tracks recorded on the storage disc. Such operation is referred to as "track following." Existing motion platforms may be adequate for following ideally (or almost ideally) circular recorded tracks, but prewritten tracks on higher density data storage discs will typically be too eccentric with respect to the spindle of the spin-stand (e.g., due to tolerances in the spindle clamp). That is, the path that the head travels as it follows a track is not likely to be precisely circular. The repeatable runout resulting from this eccentricity can be as high as 60–90 tracks on such data storage discs. Therefore, the micropositioning stage must have a large enough stroke to follow a track having a high amplitude variation from the circular ideal. As the head follows a track around a disc rotation, the micropositioning stage must be able to vary the radial position of the head substantially to accommodate the magnitude of circular irregularities in the track. A positioning stage having this capability is referred to herein as having a "large stroke." However, piezoelectric actuators presently used in existing spin stands cannot support such large amplitude irregularities observed in higher density data storage disc drives.

Accordingly there is a need for a high bandwidth, large stroke spin-stand for testing components of data storage disc drives.

SUMMARY OF THE INVENTION

Against this backdrop the present invention has been developed. A high bandwidth, large stroke spin-stand for testing components of a disc drive includes a coarse positioning stage and a rotary micropositioning stage. The spin-stand is capable of positioning a transducer head relative to the data storage disc based on one or both of: (1) an angular position of a rotary actuator arm in the rotary micropositioning stage; and (2) servo data read from the data storage disc. The angular position of the rotary actuator arm is detected by an encoder. Position adjustments may be based on the detected angular position and/or on servo data read from the data storage disc. Position adjustments may also be conditional on angular position being consistent with the servo data. Both angular position and servo data from a track may be linearized to generate PES adjustment parameters that are recorded on the data storage disc to redefine the track as more circular.

These and various other features as well as advantages which characterize the present invention will be apparent from a reading of the following detailed description and a review of the associated drawings.

DETAILED DESCRIPTION

Figure 1:
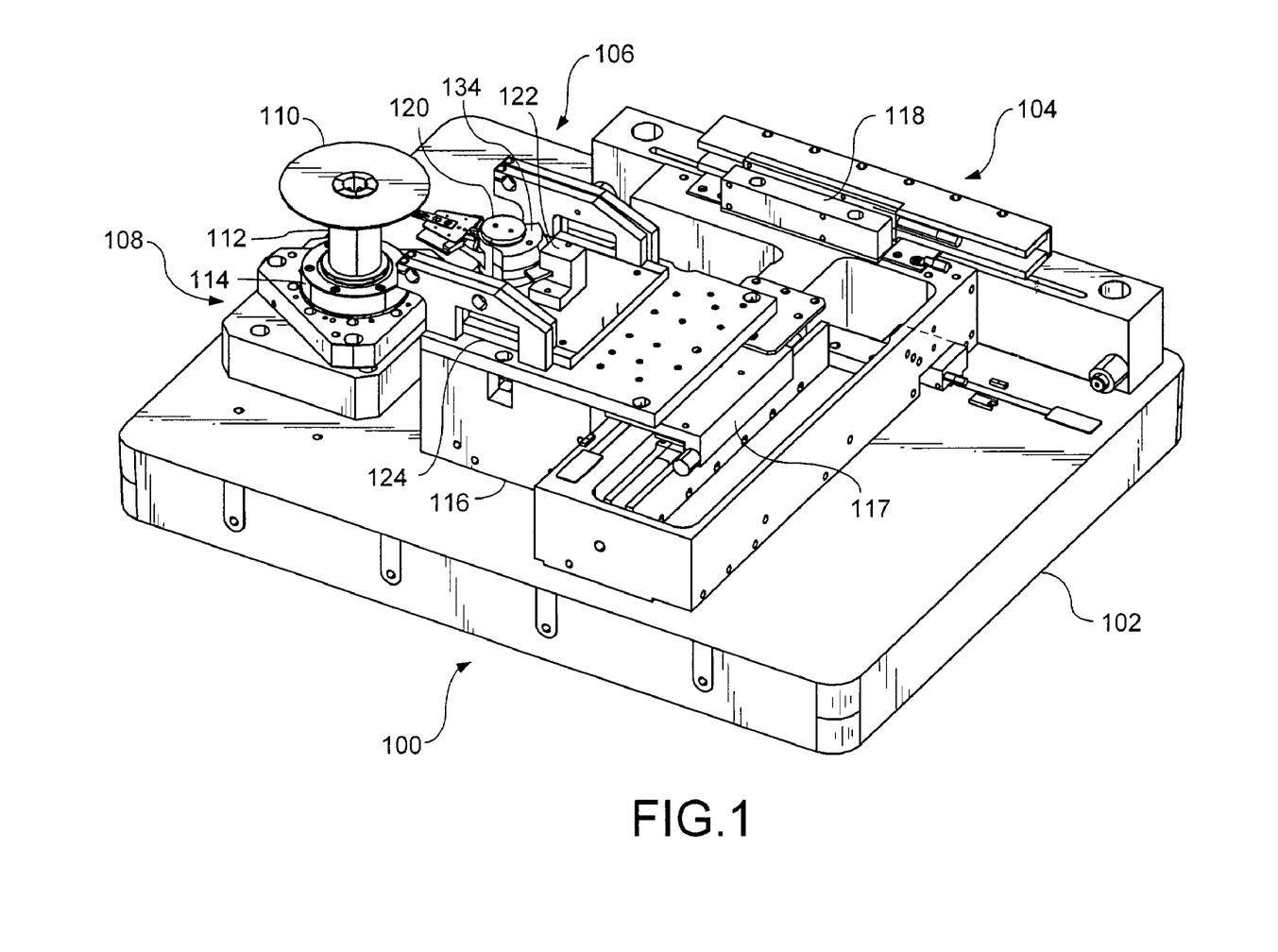
FIG. 1 is a perspective view of a high bandwidth large stroke spin-stand in an embodiment of the present invention.

FIG. 1 is a perspective view of a high bandwidth large stroke spin-stand 100 in an embodiment of the present invention. The base 102 may be constructed of any heavy and sturdy material, such as cast iron or granite, to provide stability in the spin-stand. In one embodiment of the present invention, a stable table or cabinet section (not shown) is positioned below the base 102 to raise the operational portion of the spin-stand to a convenient working height.

The spin-stand 100 includes a coarse positioning stage 104, a rotary micropositioning stage 106, and a spindle subsystem 108. During a test, a data storage disc 110 is loaded on the spindle 112 of the spindle subsystem 108. The data storage disc 110 may be unwritten or may have pre-written tracks already recorded on its recording surface. In one embodiment, the spindle 112 extends vertically upward from an air bearing 114, although other orientations are also contemplated within the scope of the present invention, including a horizontally oriented spindle. A spindle motor can rotate the spindle 112, and therefore the data storage disc 110, at high speeds (e.g., 3,600 to 15,000 RPM).

In the illustrated embodiment, the coarse positioning stage 104 includes a puck (or support block) 116, an X linear motor 117, and a Y linear motor 118, which are capable of moving the rotary positioning stage 106 in two dimensions (e.g., the X and Y directions) relative to the data storage disc 110. By moving the rotary micropositioning stage 106 relative to the data storage disc 110, the coarse positioning stage 104 can move a read/write head (mounted on an arm extending from the rotary positioning stage 106) into position relative to a radius on the data storage disc 110. The illustrated puck 116 is moved by the X linear motor 117 and the Y linear motor 118, thereby moving the rotary micropositioning stage 106 along two axes (i.e., two dimensional positioning). After the coarse positioning stage 104 moves a read/write head over a radius on the data storage disc 110, the coarse positioning stage 104 is securely locked down on the base 102 using a vacuum lock. Given the large surface area shared between the coarse positioning stage 104 and the base 102, the vacuum lock results in a very stiff positioning system.

The read/write head (not shown) is attached to a rotary actuator arm mounted on the rotary micropositioning stage 106. Subject to the coarse positioning of the read/write head relative to the target radius or track on the data storage disc 110, the rotary micropositioning stage 106 then maintains the read/write head in a precise relation to the center of the track as the data storage disc 110 rotates. Accordingly, maintaining a transducer head at a desired location relative to a data storage disc requires the positioning system to control the path of the head as it travels over the rotating disc. Such control may involve rapid adjustments to the radial position of the head as the disc rotates. Depending on the eccentricities in the track, the rotary micropositioning stage 106 may adjust the radial position of the read/write head multiple times per data storage disc rotation. Position sensing relative to the data storage disc may be obtained through position error signals (PES) and track IDs detected from servo data on the disc and/or through the angular position of a rotary actuator arm 134 in the rotary micropositioning stage 106.

The rotary micropositioning stage 106 includes a Halbach Array voice coil motor (VCM) 120, a rotary actuator arm 134, and an encoder 122. The read/write head is operably attached to the actuator arm 134. In one embodiment, the rotary micropositioning stage 106 is combined with a tip-tilt mechanism 124 to permit loading and unloading of a read/write head at an appropriate height relative to the data storage disc surface. A rotary positioning stage provides both high bandwidth and large stroke capabilities over currently used piezoelectric micropositioning stages.

Figure 2:
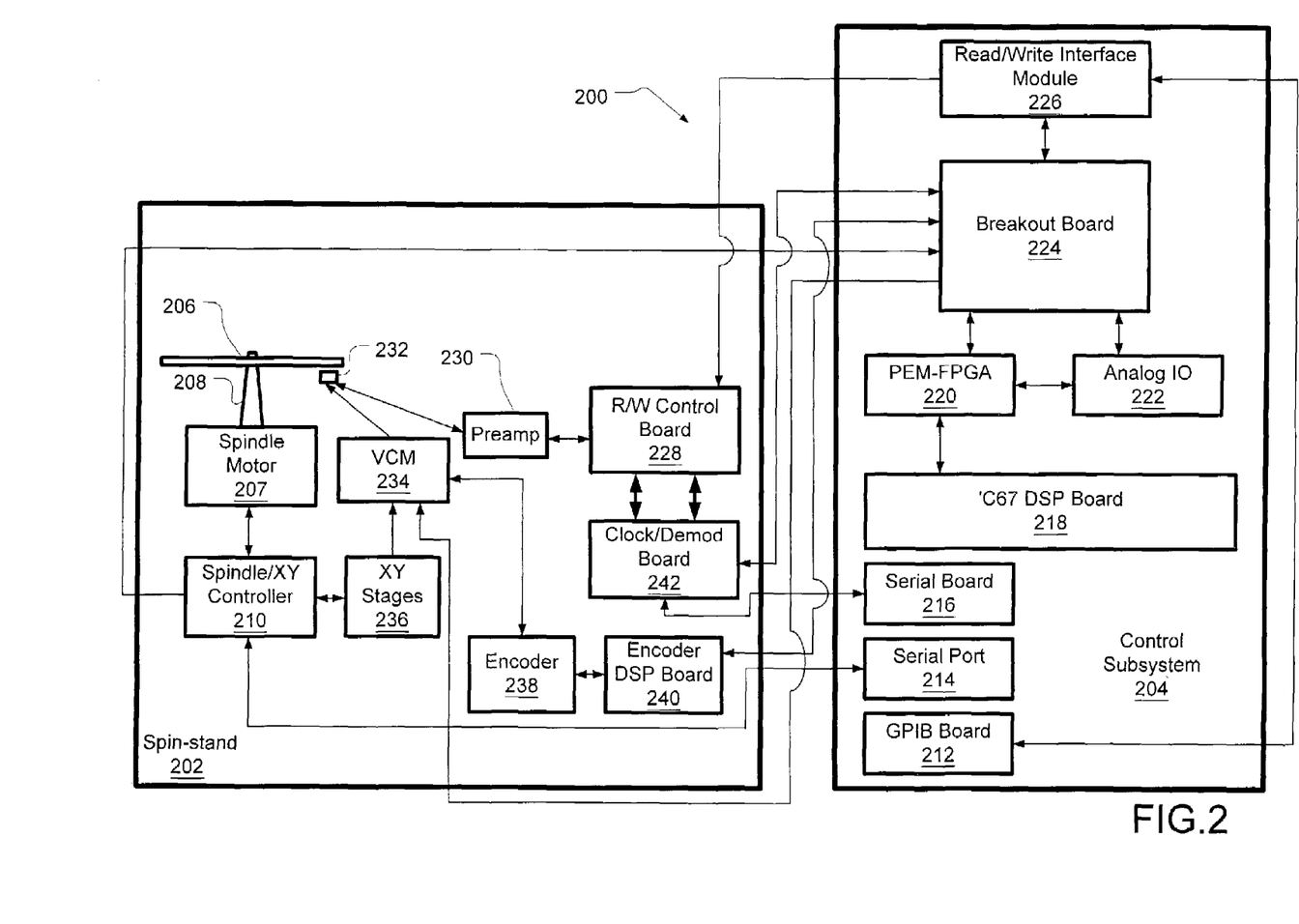
FIG. 2 depicts an architecture of a high bandwidth, large stroke spin-stand in an embodiment of the present invention.

FIG. 2 depicts an architecture of a high bandwidth, large stroke spin-stand in an embodiment of the present invention. In the illustrated embodiment, a test system 200 includes a spin-stand 202 and a control subsystem 204. The spin-stand 202 shown in FIG. 2 includes a spindle subsystem, a head positioning mechanics, and write and read circuitry.

In an embodiment of the present invention, the control subsystem 204 is embodied in a computer system having a general purpose interface bus (GPIB) board 212, a serial port 214 and a serial board 216, a digital signal processing board 218 including at least one TMS320C62/C67 ('C67) processor (referred to herein as a 'C67 DSP board 218), a Processor Expansion Module-Field Programmable Gate Array (PEM-FPGA) module 220, and an analog I/O board 222. In addition, a breakout board 224 couples many of the spin-stand 202 connectors to connectors of the PEM-FPGA module 220 and the analog I/O board 224. The read/write interface module 226 couples the read/write electronics in the spin-stand 202 to the digital signal processing electronics in the control subsystem 204. The breakout board 224 may also buffer signals being transmitted to the PEM-FPGA board 220 so as to minimize transmission line issues caused by the high frequency components of the signals.

With regard to the spindle subsystem, a data storage disc 206 is mounted on the spindle 208 (e.g., the spindle 208 is inserted into a center hole in the data storage disc 206 and secured thereon via a clamp). A spindle motor 207 rotates the spindle 208, thereby rotating the data storage disc at a high speed (e.g., 3,600 to 15,000 RPM, although higher and lower speeds are contemplated within the scope of the present invention). The rotation (e.g., rotation speed) of the spindle 208 by the spindle motor 207 and the XY position of the head are controlled by the control subsystem 204 through the COM port 214 and a spindle/XY controller 210. Spindle rotation and stage positioning parameters are transmitted as ASCII strings from the COM port 214.

An exemplary head positioning control system includes coarse positioning mechanics having XY stages 236 that are also coupled to the spindle/XY controller 210. The spindle/XY controller 210 controls the positioning of the XY stages 236, and therefore controls the coarse positioning of a read/write head in the Head Gimbal Assembly (HGA) 232 relative to a target track on the data storage disc 206. A read/write head is mounted from the tip of an arm on the HGA 232. The spindle/XY controller 210 may also control solenoids and relays that manipulate the tip-tilt mechanism to allow loading and unloading of test components and data storage discs. The control subsystem 204 and the spindle/XY controller communicate via a serial port 214 in the control subsystem 204. An exemplary spindle/XY controller 210 is a programmable multi-axis controller (PMAC) controller from Dover Instruments. Alternative configurations, including distinct spindle and XY controllers, are contemplated within the scope of the present invention.

Exemplary micropositioning mechanics in a head positioning control system include a rotary voice coil motor (VCM) 234 that provides micropositioning of the HGA 232 relative to a track on the data storage disc 206. In one embodiment, the combination of a Halbach array VCM 234 and a balanced rotary actuator arm ensure a lack of excitation of the bearing translation mode, thereby allowing for high bandwidth control schemes. For example, the rotary micropositioning stage may be designed to have a first resonant mode of vibration at 8.7–9.0 KHz, although other resonant frequencies are contemplated within the scope of the present invention.

Position data may be received from an encoder 238 or from servo data read from the data storage disc 206. The encoder 238 detects the angular position of the VCM 234 (and therefore radial position of the HGA 232 relative to the data storage disc 206). In one embodiment, the encoder 238 includes an optical rotary encoder, which is used as an external reference metric. An exemplary optical encoder (such as may be purchased from MicroE Systems) has 13667 gratings over a 60-degree wedge, which are resolved into 16384 counts through a sine-cosine interpolation scheme implemented through the encoder DSP board 240. Using the exemplary characteristics, the encoder may provide a gain of $3.7319 \times 10^6$ counts/degree, resulting in a resolution at the arm tip of 0.34 nm. The detected angular position data and the control signal data are communicated with the control subsystem 204 via an encoder DSP board 240. The angular position detected by the encoder 238 is processed by a 'C67 DSP chip in the control subsystem 204, which may provide control signals to the VCM 234 to correct the position relative to the target track on the data storage disc 206.

The encoder position is available as a 28-bit word generated from the interpolation by the encoder DSP board 240, which is coupled to the breakout board 224 via a 64-conductor ribbon cable. In addition to data lines, the 64-conductor ribbon cable also includes two control lines to hold the encoder value during a read operation and a reset line to reset the encoder to zero. The encoder 238 may be used as (1) an external position sensor when the spin stand is used to write servo tracks (i.e., open-loop with respect to the disc surface); (2) to calibrate different servo track writing approaches for servo format metrics, such as squeeze; or (3) to guard against HGA damage resulting from a loss of PES (Position Error Signal) feedback while the HGA is following a track.

Servo data, recorded in servo sectors on the data storage disc 206, may be read by a read head on the HGA 232. A clock/demodulator board 242 receives the servo data through a preamp 230 and a R/W (read/write) control board 228 and determines the radial and circumferential position of the HGA 232 relative to the data storage disc 206, based on magnetic transitions present on the data storage disc 206. Servo data, which is recorded in servo sectors on the data storage disc 206, includes servo bursts that may be detected by a read head. A Position Error Signal (PES), which indicates the read head's offset from the center of the target track, may be computed based on the reading of servo bursts from the data storage disc 206. The PES data is available serially on the head pins of the clock/demod board 242, connected to the breakout board 224 by means of a ribbon cable.

In one embodiment, four digital signal lines transmit data from the clock/demod board 242 to the 'C67 DSP board 218. One of the lines communicates the Servo Gate signal. The other three (Servo Clock, Servo Data 1, and Servo Data 2) are used to transfer data serially. As such, eight bits may be transferred in 4 clock cycles, four bits per Servo Data line. Alternatively, other signaling schemes may be employed, such as a single Servo Data line. Other servo data may include gray code that can be decoded into the binary track identifier (ID).

The control subsystem 204 communicates with the clock/demod board 242 through a serial board 216. In one embodiment, the serial communications are transmitted via a fiber optic line leading from the serial board 216. The clock/demod board 242 is daisy chained over to the R/W control board 228, which communicates via the preamp 230 over serial lines on a flex connector. Preamp parameters, such as the write current, the bias current, gain, and mode of operation (e.g., bias type relating to current) are set using this serial interface. In addition, registers in the preamp 230 may also be accessed by the R/W control board 228 via the serial interface.

The control subsystem 204 provides fast rotary axis control of the VCM 234 using a 'C67 DSP board 218 plugged into a standard PCI slot in a host computer. In one embodiment, the DSP board comprises two 'C67 DSPs from Texas Instruments, although other computational units may be used without departing from the present invention. Both DSPs are floating point processors and permit quick and easy implementation of various digital control algorithms. Input and output signals from the DSP board 218 are communicated via two daughter boards: (1) the analog I/O board 222 and (2) the PEM-FPGA board 220.

Figure 3:
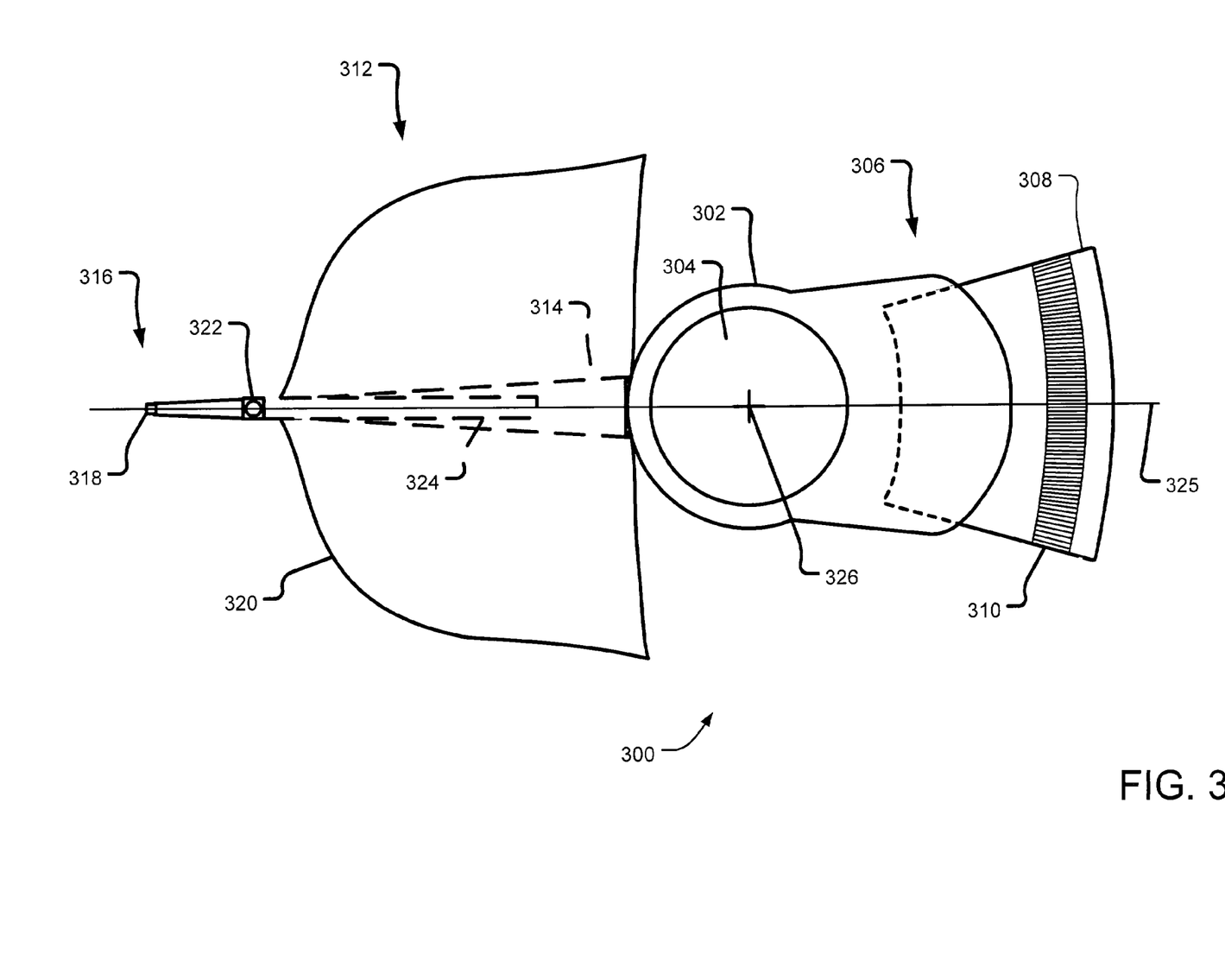
FIG. 3 illustrates a schematic top view of an actuator arm in a rotary micropositioning stage in an embodiment of the present invention.

FIG. 3 separately illustrates a schematic top view of an actuator arm in a rotary micropositioning stage in an embodiment of the present invention. The actuator arm assembly 300 includes a rotary body 302 having a hollow cylindrical section 304, which is inserted over the Halbach VCM (not shown). The hollow cylindrical section 304 has an axis 326 that is substantially parallel with the axis of the data storage disc rotation. The rotary body end 306 includes a slot into which an encoder plate 308 for the optical rotary encoder (not shown) is inserted. The rotary body end 306 also acts as a counterweight to balance the actuator arm assembly 300 about the axis 326 of the rotary actuator arm 302. The encoder plate 308 includes an optical grating 310, which the encoder monitors to determine the angular position of the actuator arm assembly 300.

The end 312 includes an actuator arm section 314 extending away from the axis 326 of the hollow cylinder section 304 to support the HGA 316, which is attached to the actuator arm section 314 by a mounting tool 324 at attachment point 322. The HGA 316 includes a transducer head. The actuator arm section 314 also supports a preamp board (not shown) that amplifies read signals sent to the read circuitry in the spin-stand, and a wing 320 that balance the rotary actuator arm assembly 300 about the axis 325 to improve stability during operation. The components shown in FIG. 3, including the preamp, are configured to balance the rotary actuator arm assembly 300 about the axis 326.

Figure 4:
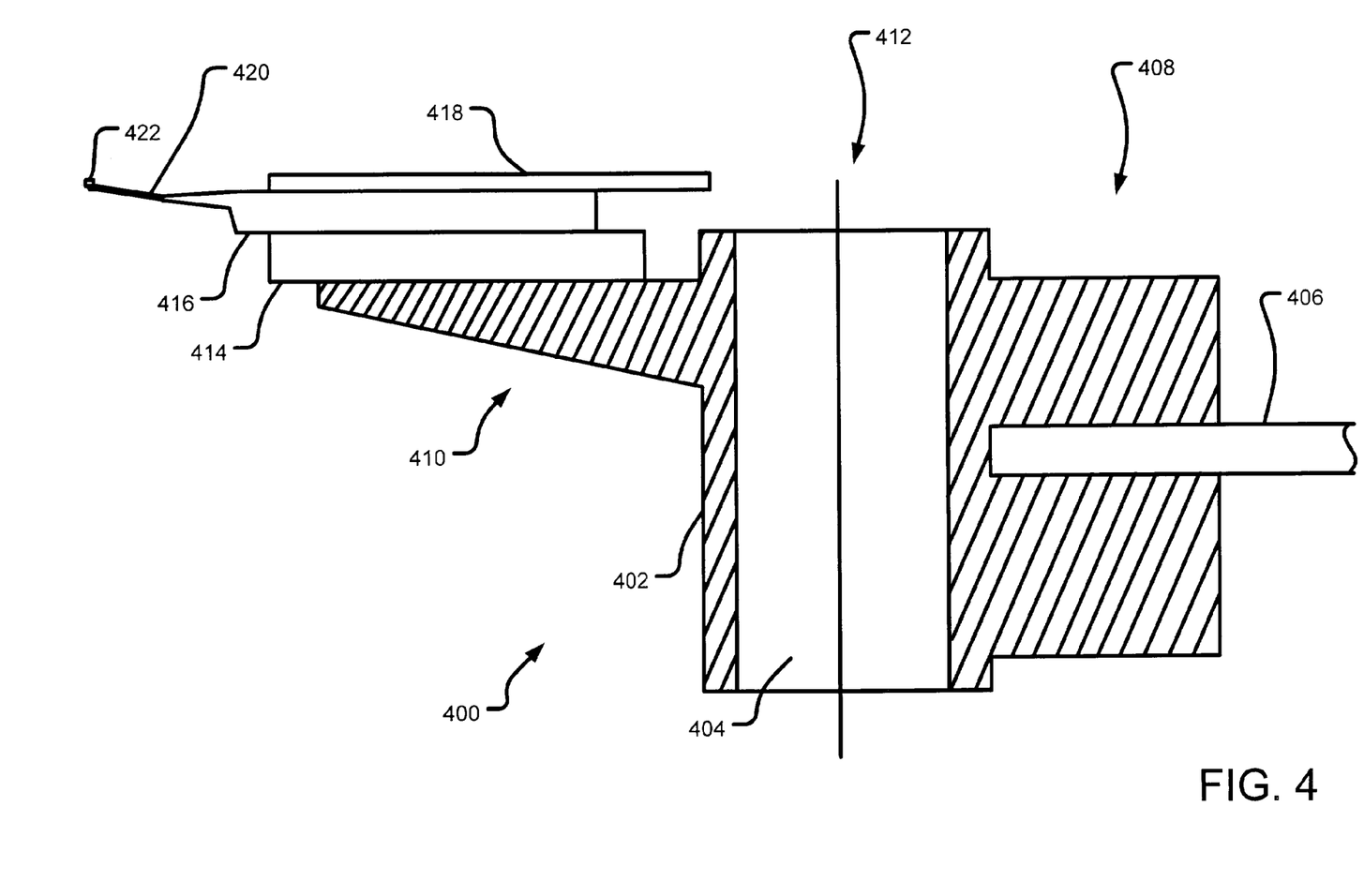
FIG. 4 illustrates a schematic side view of an actuator arm in a rotary micropositioning stage in another embodiment of the present invention.

FIG. 4 illustrates a schematic side view of an actuator arm 400 of a rotary micropositioning stage in another embodiment of the present invention. It should be understood that the stage illustrated in FIG. 4 may or may not have a top view similar to the one shown in FIG. 3.

The actuator arm 400 is an elongated body having three sections: an actuator hub section 402 about a hollow cylindrical section 404, an arm section 410, and an encoder end section 408. The actuator hub section 402 is inserted over the Halbach VCM (not shown). An axis 412 indicates the axis of rotation of the rotary actuator arm 400. An encoder plate 406 is inserted into a slot in the encoder end section 408. After the actuator arm 400 is installed in the spin stand, the encoder plate 406 moves through a slot in an encoder module (not shown) on the spin stand to provide angular position information. The encoder end 408 may also be heavily weighted to provide a counterweight to the actuator arm section 410 so that the actuator arm 400 is balanced front to back relative to the axis 412.

The arm section 410 extends from the axis 412 opposite of the encoder end section 408 to support a preamp board 414, a mounting tool 416, and a wing 418. The mounting tool 416 (also called an Integrated Assembly for Test (IAT) tool, supports a flexure 420 and the HGA 422 and is used to facilitate installing the HGA 422 on the rotary actuator arm 400. A head is shown on the HGA 422. The components shown in FIG. 4 are configured to balance the rotary actuator arm 400 about the axis 412. The preamp board 414 and the HGA 422 may be interchanged with other preamp boards and HGAs, depending on the intended manufacturer or design of the system under test.

The high bandwidth large stroke capabilities of the embodiments described herein may be combined with at least one of two sources of position feedback (i.e., encoder and servo data) to yield at least three different modes of operation: (1) encoder servo mode with timer set sampling; (2) encoder servo mode with servo gate sampling; and (3) track following servo. However, the three different modes of operation are described as examples only. Many other applications of the embodiments of the present invention are contemplated within the scope of the present invention.

Figure 5:
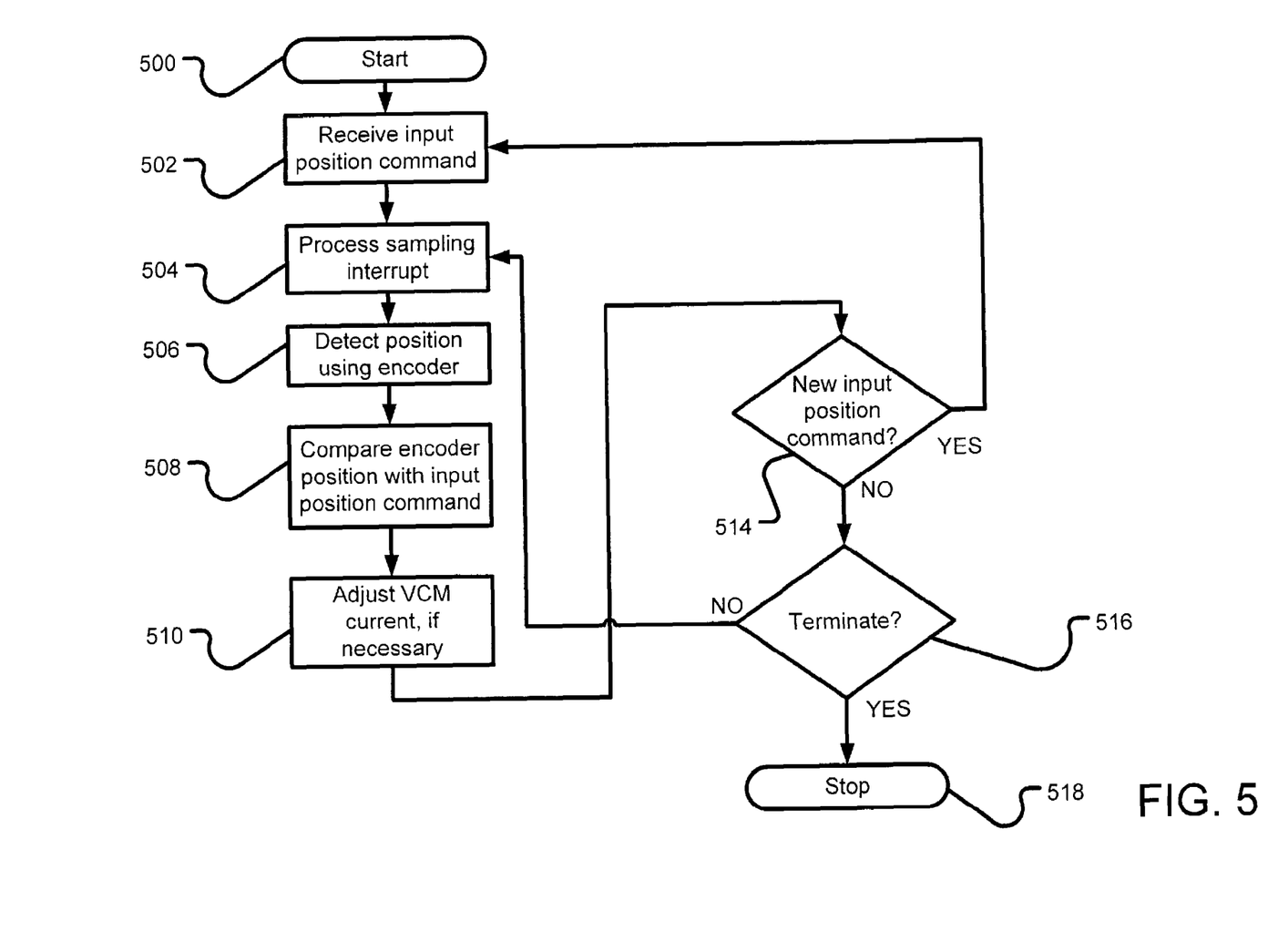
FIG. 5 illustrates operations for encoder servo mode in an embodiment of the present invention.

FIG. 5 illustrates operations for an encoder servo mode in an embodiment of the present invention. In an "encoder servo mode with timer set sampling", the encoder is used to provide position feedback absent servo data being read from the data storage disc (e.g., such as when the spin-stand is used to write servo data to an unwritten disc). This mode is also useful at power-up to hold the rotary actuator arm at a stable position, even in the absence of a head and a disc. The "open-loop" encoder positioning approach is also useful for "open-loop" testing. For example, if the tracks-per-inch (TPI) testing capabilities are sufficient without reliance on PES, then track following is not required and the tester can operate in "open-loop" mode, without servo-based position sensing. The control system samples the angular position of the rotary actuator arm to determine whether the head is positioned at a desired radius on the data storage disc and adjusts the position, if necessary.

As discussed above, the timer set sampling mode is independent of servo data read from a data storage disc, making it useful for writing servo data to an unwritten data storage disc. For each track, the angular position of the actuator mount is set and maintained via the VCM, and new servo data is recorded at the appropriate radial and circumferential position of the head relative to the data storage disc surface. After servo data for one track is recorded on the data storage disc, the position is adjusted to the radial position of a new track for recording of servo data for the new track.

Sampling is controlled by interrupts that are generated by internal timers of the 'C67 chips. The sampling rate is user-configurable. In response to each interrupt, an interrupt service routine samples the angular position of the rotary actuator arm, which is positioned relative to the VCM axis and, if necessary, adjusts the current to the VCM to adjust the angular position of the rotary actuator arm based on the desired radial position of the target track.

In an "encoder servo mode with servo gate sampling", the sampling interrupts are derived from the servo gate signal, which changes state when the next servo data frame is expected to be read by the read head. A state machine raises the servo gate signal at the expected time of the next servo sector, re-adjusting the timing of the servo gate timing based on the position of the previous servo sectors read from the data storage disc.

Again, in response to each sample interrupt, an interrupt service routine samples the angular position of the rotary actuator arm, which is positioned relative to the VCM axis and, if necessary, adjusts the current to the VCM to adjust the angular position of the rotary actuator arm based on the desired radial position of the target track.

In an encoder servo mode, a START operation 500 initiates the positioning process. An input operation 502 receives an input position command specifying a desired position relative to a data storage disc installed on a spindle in the spin-stand and moves the head to the desired position. The input position may be in the form of a radial position and may be translated to an angular position associated with the rotary actuator arm. Alternatively, the input command may be an angular position, although this alternative is typically less convenient for the user. In another embodiment, a track ID and other disc characteristics may be input to the control subsystem, which would generate an appropriate radial or angular position corresponding to the desired track.

A processing operation 504 processes a sampling interrupt, which as described above may be generated in a number of ways. In one embodiment, an internal timer in the 'C67 DSP chip generates interrupts at a pre-determined sampling rate. This embodiment is particularly useful when a data storage disc does not have any servo information recorded on its surface. The encoder position information, for example, can be used to initially record servo data on a data storage disc (referred to as "servo writing"). For each track, the actuator arm is set to an appropriate radial position on the data storage disc and a write head records appropriate servo data on the data storage disc surface.

In an alternative embodiment, a read head reads servo data from the data storage disc surface and detects the beginning of each servo sector encountered by the read head. During normal operation, when the read head encounters a servo sector, a servo gate signal is asserted to prevent writing to the servo sectors of the data storage disc. In this embodiment, the sampling interrupt is generated from the rising edge of the servo gate signal so that the encoder position is monitored at each servo sector.

In response to the sampling interrupt, the angular position of the actuator is detected using the encoder in a detecting operation 506. One or both of the encoder-detected position ("encoder position") and the input position may be translated into a common reference frame (e.g., the encoder position is translated from an angular position to a radial position of the head). A comparison operation 508 compares the encoder position with the input position to determine whether the position of the actuator arm must be adjusted. An adjustment operation 510 modifies the current supplied to the VCM to adjust the position of the actuator arm (and therefore the head), if necessary.

A decision operation 514 determines whether a new input position command has been received. If so, processing returns to input operation 502 to obtain the new input position. Otherwise, processing proceeds to a decision block 516 that determines whether the positioning process is to be terminated, such as by a command from the user. If so, the positioning process terminates at STOP operation 518. Otherwise, the positioning process loops back to interrupt operation 504 as the next timer interrupt or servo gate signals the next position sample. In this manner, the spinstand and control subsystem can continuously use the encoder to monitor the position of the head relative to the data storage disc as it rotates.

Figure 6:
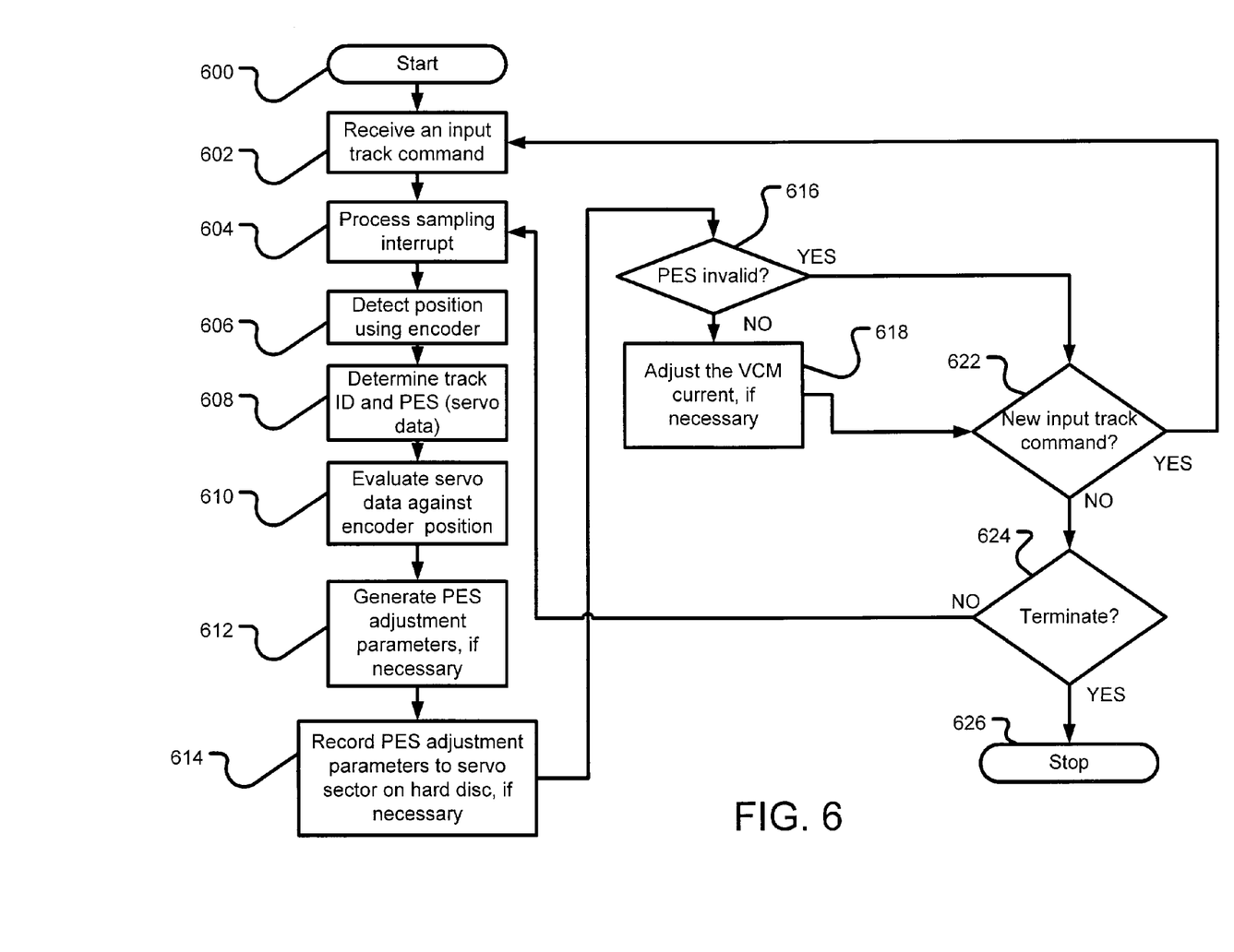
FIG. 6 illustrates operations for track following servo mode in an embodiment of the present invention.

FIG. 6 illustrates operations for track following servo mode in an embodiment of the present invention. In track following servo mode, the sampling rate is set using the servo gate. However, the read head also reads the track ID and generates a PES as feedback while the encoder is monitored at each sample interrupt. By correlating the track ID with the angular position of the actuator mount (as detected by the encoder), the position of the read/write head can be controlled when the PES is lost, which can otherwise send the actuator arm out of position. Often, loss of PES in a positioning system dependent only on servo data can send the actuator arm crashing into a stop at either the inner diameter (ID) or outer diameter (OD) of the data storage disc, thereby damaging the actuator arm or head. In addition, if no crash stops exists, such is frequently the case in testing application, the head could fly off the edge of the data storage disc, which is also likely to damage the HGA.

In an embodiment of track following servo mode, the position information associated with the servo data is compared to the position information associated with the encoder. If the servo data erroneously indicates that the head is drifting dramatically off-track, thereby requiring a dramatic position adjustment by the VCM, the encoder position date can invalidate the servo data and prevent the extreme adjustment and the potential crash.

In addition, evaluation of both the servo data and the encoder data can produce PES adjustment parameters that are recorded on the data storage disc. The PES adjustment parameters may be used to modify the desired position or path of a track or a track portion without rewriting the servo sectors for the entire disc. This manner of adjustment allows the track or track portion to be redefined to a more circular ideal or particularly to linearize the PES on a sector-by-sector basis.

In track following servo mode, a START operation 600 initiates the positioning process. An input operation 602 receives an input track command specifying a desired track on the data storage disc and moves the head to the desired track on the data storage disc. A processing operation 604 processes a sampling interrupt, which is typically generated using the servo gate signal. In response to the sampling interrupt, the angular position of the actuator is detected using the encoder in a detecting operation 606. A servo operation 608 determines servo data (e.g., track ID and the PES) based on the currently detected servo sector. An evaluation operation 610 evaluates the servo data against the encoder position.

One purpose for this evaluation is to generate PES adjustment parameters to correct for eccentricities in the track or other written-in PES errors, as shown in a generation operation 612. For example, when the servo data is initially recorded, the tracks defined by the servo data may depart from a circular ideal. Without attempting to rerecord the servo bursts in a more ideally circular pattern, the encoder position and the PES are evaluated over a large number of rotations to determine PES adjustment parameters (using a linearization procedure), which can be used to alter the raw PES data (derived from the servo bursts in the servo sector) to produce an adjusted PES. The adjusted PES accounts for eccentricities in the initially recorded track (e.g., as defined by the recorded servo bursts) and essentially redefines the track into a more ideally circular form. That is, the PES adjustment parameters tell the positioning system where the track would have been had the servo bursts been written in a more ideally circular manner. The adjusted PES is then used to generate the actuator adjustment current to reposition the head over the center of the altered or more idealized track during drive operation.

Because the PES adjustment parameters are determined at each sampling interrupt, which is issued at each servo sector, the PES adjustment parameters may be stored on a sector-by-sector basis in a recording operation 614. This approach provides excellent precision because it adjusts the PES to define a more circular track between individual servo sectors.

One of the advantages of having an additional position sensor is that it can be used to calibrate the PES on a sector-by-sector basis. When the servo data are written, there are typically repeatable errors recorded into the servo pattern. These errors primarily involve non-repeatable runout (NRRO) that is "frozen-in" at the time of the servo track writing process. There may be additional errors caused by the head writing field track edge effects and the possible non-uniformity of the media, as well as the discrete grain structure of the media.

Figure 7:
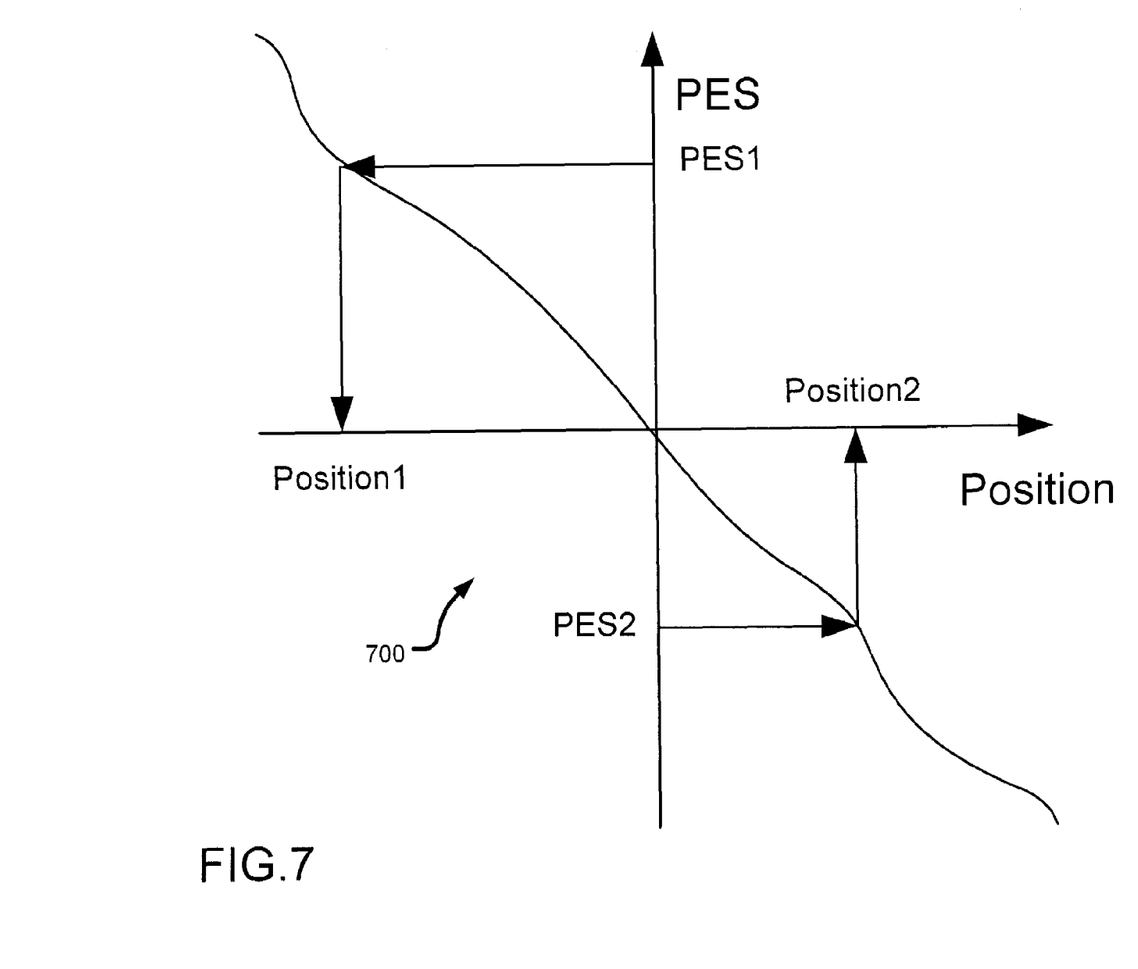
FIG. 7 illustrates a graph of look-up table points for linearization of PES data in an embodiment of the present invention.

However, the PES may be adjusted to remove the effects of the written-in repeatable runout by learning the repeatable error for each servo sector. Essentially, the shape of the PES is estimated for each track, by reading the PES from a track at multiple offsets across the track. A look-up table relating the PES to the true position detected by the encoder is created. The number of cross-track points, and the radial width of the look-up table are arbitrary. For example, 20 cross-track points of +/−½ track about the target track centerline may be sufficient. The size of the look-up tables by sector is limited only by the amount of available memory and the time available to do the correlation.

The look-up table is generated by moving the head to successive radial positions using encoder positioning. At each position, the PES for each sector is read over multiple revolutions to generate sufficient servo data to estimate the PES at each radial position by averaging the multiple revolutions of data. This procedure is repeated at each of the cross-track positions to generate a look-up table relating PES to position for each sector. Each servo sector will have a look-up table that will be accessed by the controller to translate the PES value to a true position value for the servo control algorithm.

FIG. 7 illustrates a graph 700 of look-up table points for linearization of PES data in an embodiment of the present invention. For example, if PES1 is read, this value is translated into Position1. This procedure can be done at any cross-track radial position, such as shown for Position2. If the PES value does not correspond to the averaged PES that is stored in the look-up table at the corresponding cross-track position, standard interpolation methods can be used to determine intermediate values, which may be used to generate PES adjustment parameters.

As discussed, another purpose for this evaluation operation is to validate the PES. For example, under certain conditions, the current servo data may be corrupt or may be misread by the components being tested. In such a circumstance, the encoder position acts as a "sanity check" to prevent the actuator arm from crashing into the ID or OD in an attempt to get back on track based on corrupt PES data.

Returning to the description of FIG. 6, if the evaluation with the encoder position indicates that the PES is valid, as determined in a decision operation 616, an adjustment operation 618 adjusts the VCM current to better position the head to the input track on the data storage disc, if necessary.

If the evaluation with the encoder position indicates that the PES is invalid, as determined in the decision operation 616, processing proceeds to a decision operation 622, which determines whether a new input track command has been received. If so, processing returns to input operation 602 to obtain the new input position. Otherwise, another decision block 624 determines whether the positioning process is to be terminated, such as by a command from the user. If so, the positioning process terminates at STOP operation 626. Otherwise, the positioning process loops back to interrupt operation 604 as the next timer interrupt or servo gate signals the next position sample. In this manner, the spin-stand and control subsystem can continuously use the encoder to monitor the position of the head relative to the data storage disc as it rotates.

In an alterative embodiment, if the PES is found to be invalid in the decision operation 616, the encoder position may be employed to adjust the radial position of the actuator head relative to the input position, as discussed with regard to FIG. 5.

In summary, a spin-stand positioning system (such as 100) positions a transducer head (such as part of the HGA 422) at a desired position relative to a data storage disc (such as 110) rotating on a spindle subsystem (such as 108). A rotary micropositioning stage (such as 106) includes a rotary actuator arm (such as 400) having an axis of rotation (such as 412). The rotary actuator arm also supports the transducer head relative to the data storage disc. A voice coil motor (such as 120) is connected to the rotary actuator arm for positioning the rotary actuator arm in response to control current. An encoder (such as 122) measures an angular position of the rotary actuator arm. A coarse positioning stage (such as 104) supports the rotary micropositioning stage operable to position the transducer head at the desired position relative to the data storage disc. A position control subsystem (such as 204) is connected to supply control current to the voice coil motor. The control current is conditional on the angular position measured by the encoder, to maintain the transducer head at the desired position relative to the data storage disc as the data storage disc rotates.

The voice coil motor may be a Halbach array voice coil motor. The rotary micropositioning stage may also include a preamp board (such as 414) that is operably attached to the rotary actuator arm to amplify read signals received from the transducer head, a mounting tool (such as 416) that extends from the rotary actuator arm to support the transducer head on an head gimbal assembly (such as 4122) relative to the data storage disc, and an encoder plate (such as 406) that is attached to the rotary actuator arm and is operably coupled to the encoder to determine the angular position of the rotary actuator arm. The rotary actuator arm may also include a wing (such as 418) that is attached to the rotary actuator arm to balance the wing, the encoder plate, the head gimbal assembly, the mounting tool, the preamp, and the rotary actuator arm about the axis of the rotary actuator arm.

The spin-stand positioning system may also include a demodulator (such as 242) connected to the preamplifier to generate from servo data read from the data storage disc a track identifier specifying an identified track on the data storage disc and a position error signal characterizing an offset of the transducer head relative to the identified track.

The position control subsystem may include a processor (such as on 218) that adjusts control current to the voice coil motor in accordance with the position error signal, if the position error signal and track identifier are consistent with the angular position measured by the encoder. The processor may alternatively bypass adjustment of control current to the voice coil motor in accordance with the position error signal, if the position error signal and track identifier are not consistent with the angular position measured by the encoder or adjusts control current to the voice coil motor in accordance with the angular position measured by the encoder, if the position error signal and track identifier does not agree with the angular position.

A processor (such as 218) may also evaluate the position error signal, track identifier, and angular position measured by the encoder to generate a position error signal adjustment parameter to redefine the track as substantially circular on the data storage disc. The processor (such as 218) may also translating the angular position measured by the encoder to a radial position of the transducer head relative to the data storage disc.

A method of positioning a transducer head (such as part of the HGA 422) at a desired position relative to a data storage disc (such as 206) rotating on a spindle subsystem (such as 108) is provided. The transducer head is supported relative to the data storage disc by a rotary actuator arm (such as 400). A voice coil motor (such as 120) rotates the rotary actuator arm. A receiving operation (such as 502) receives position data specifying the desired position on the data storage disc. A detection operation (such as 506) detects an angular position of the rotary actuator arm. An evaluating operation (such as 508) evaluates the detected angular position against the position data. An adjustment operation (such as 510) adjusts control current applied to the voice coil motor to rotate the rotary actuator, arm based on the detected angular position of the rotary actuator arm, to position the transducer head at the desired position relative to the data storage disc as the data storage disc rotates.

The receiving operation (such as 502) may receive an input position command specifying the desired position of the transducer head relative to the data storage disc. The evaluating operation (such as 508) may compare the detected angular position against the input position command to determine a difference between the desired position of the transducer head relative to the data storage disc and a current position of the transducer head relative to the data storage disc. The receiving operation (such as 502) may also determine servo data from the data storage disc specifying the desired position of the transducer head compared to a current position of the transducer head relative to the data storage disc. The evaluating operation (such as 508) may also compare the detected angular position with the servo data to determine a difference between the desired position of the transducer head relative to the data storage disc and the current position of the transducer head relative to the data storage disc. The rotary actuator arm (such as 400) has an axis of rotation (such as 412) about which the rotary actuator arm and attached components are balanced.

A detecting operation (such as 608) detects servo data from the data storage disc. An evaluating operation (such as 610) evaluates the servo data and detected angular position to generate a position error signal adjustment parameter, thereby redefining the track as more circular on the data storage disc. A decision operation (such as 616) may bypass adjustment of control current to the voice coil motor in accordance with the position error signal, if the servo data is not consistent with the angular position measured by the encoder. An adjusting operation (such as 618) may adjust control current to the voice coil motor in accordance with the detected angular position, if the servo data is not consistent with the detected angular position.

A spin-stand (such as 100) includes a spindle subsystem (such as 108) for rotating a data storage disc (such as 110) having a track position and means (such as 204) for positioning a head (such as part of 422) relative to the radial track position on the data storage disc.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, alternative coarse positioning stages may be employed; angular position, radial position, and servo data may be communicated via various protocols, and the balanced orientation of components on the rotary actuator arm may be altered. Numerous other changes may be made which will readily suggest themselves to those skilled in the art and which are encompassed in the spirit of the invention disclosed and as defined in the appended claims.

What is claimed is:

1. A spin-stand comprising:
    a rotary actuator and which supports a transducer head adjacent a data storage medium;
    an encoder which determines an angular position of the actuator arm; and
    a control circuit which translates the angular position from the encoder to a radial position of the head with respect to the medium.

2. The spin-stand of claim 1 wherein the actuator arm is rotated by a Halbach array voice coil motor.

3. The spin-stand of claim 1 further comprising:
    a preamp board operably attached to the rotary actuator arm to amplify read signals received from the transducer head;
    a mounting tool extending from the rotary actuator arm to support the transducer head on a head gimbal assembly relative to the data storage disc; and
    an encoder plate attached to the rotary actuator arm and being operably coupled to the encoder to determine the angular position of the rotary actuator arm.

4. The spin-stand of claim 1 further comprising a demodulator connected to the preamp to generate from servo data read from the data storage medium a track identifier specifying an identified track on the medium and a position error signal characterizing an offset of the transducer head relative to the identified track.

5. The spin-stand of claim 4 wherein the control circuit further adjusts control current to a motor coupled to the actuator arm in accordance with the position error signal, if the position error signal and track identifier are consistent with the angular position determined by the encoder.

6. The spin-stand of claim 4 wherein the control circuit further bypasses adjustment of control current to a motor coupled to the actuator arm in accordance with the position error signal, if the position error signal and track identifier are not consistent with the angular position determined by the encoder.

7. The spin-stand of claim 4 wherein the control circuit further adjusts control current to a motor coupled to the actuator arm in accordance with the angular position determined by the encoder, if the position error signal and track identifier do not agree with the angular position.

8. The spin-stand of claim 1 wherein the control circuit further evaluates servo data transduced by the head from a track on the medium and the angular position determined by the encoder to generate a position error signal adjustment parameter to redefine the track as substantially circular.

9. A method comprising:
    transducing servo data from a data storage medium using a transducer head supported adjacent the medium by a rotary actuator arm;
    detecting an angular position of the actuator arm; and
    bypassing adjustment of control current to a motor coupled to the actuator arm in accordance with the transduced servo data if said servo data are not consistent with the detected angular position of the actuator arm.

10. The method of claim 9 wherein the transducing step comprises transducing the servo data from a track on the medium, and wherein the method further comprises evaluating the servo data and detected angular position to generate a position error signal adjustment parameter, thereby redefining the track as substantially circular.

11. The meted of claim 9 further comprising adjusting control current to the motor in accordance with the detected angular position, if the servo data are not consistent wit the detected angular position.

12. The meted of claim 9 further comprising translating the detected angular position to a radial position of the head wit respect to the medium.

13. The method of claim 9 wherein the motor of the bypassing step is characterized as a Halbach array voice coil motor.

14. The method of claim 9 wherein the transducing step comprises generating, from the servo data, a track identifier specifying an identified track on the medium and a position error signal characterizing an offset of the transducer head relative to the identified track.

15. The method of claim 9 further comprising adjusting control current to the motor in accordance with the transduced servo data, if the transduced servo data are consistent with the detected angular position of the actuator arm.

16. A spin-stand comprising a rotary actuator arm which supports a transducer head adjacent a data storage medium, and a Halbach array voice coil motor configured to move the actuator arm with respect to the medium.

17. The spin-stand of claim 16, further comprising an encoder which determines an angular position of the actuator and.

18. The spin-stand of claim 17, further comprising a control circuit which selectively applies control current to the motor to position the transducer head adjacent the medium in relation to the determined angular position and servo data transduced by the head from the medium.

19. The spin-stand of claim 18, wherein the control circuit further generates a position error signal adjustment parameter in relation to the determined angular position and the transduced servo data to define a substantially circular track on the medium.

\* \* \* \* \*